United States Patent [19]

Fukuhara

[11] Patent Number: 4,696,128
[45] Date of Patent: Sep. 29, 1987

[54] DEVICE FOR SECURING MOLDING OF AUTOMOBILE DOOR

[75] Inventor: Kunihiro Fukuhara, Toyota, Japan

[73] Assignee: Nifco, Inc., Yokohama, Japan

[21] Appl. No.: 823,680

[22] Filed: Jan. 29, 1986

[30] Foreign Application Priority Data

Feb. 5, 1985 [JP] Japan .................. 60-14223[U]

[51] Int. Cl.$^4$ .................................. E06B 7/16
[52] U.S. Cl. ......................... 49/492; 24/297;
  24/458; 49/377; 52/718.1
[58] Field of Search .............. 24/289, 336, 292–295,
  24/297, 573, 458; 49/372, 377, 492; 52/717.1,
  718.1

[56] References Cited

U.S. PATENT DOCUMENTS

| | | | |
|---|---|---|---|
| 2,216,219 | 10/1940 | Wiley | 24/293 |
| 2,476,207 | 7/1949 | Brown | 24/289 |
| 2,742,984 | 4/1956 | Bedford, Jr. | 52/718.1 |
| 2,959,259 | 11/1960 | Meyer | 24/297 X |
| 3,197,935 | 8/1965 | Clancy et al. | 24/297 X |
| 3,245,182 | 4/1966 | Zierold | 24/336 X |
| 3,977,048 | 8/1975 | Benedetti | 52/718.1 X |
| 4,344,653 | 8/1982 | Sheldon | 24/295 X |
| 4,348,061 | 9/1982 | Bowling | 24/295 X |
| 4,527,369 | 7/1975 | Adams | 52/718.1 X |

FOREIGN PATENT DOCUMENTS 1562236  4/1969  France .................. 24/295
58-4419  1/1983  Japan .

Primary Examiner—Kenneth J. Dorner
Assistant Examiner—James R. Brittain
Attorney, Agent, or Firm—Trexler, Bushnell, Giangiorgi & Blackstone, Ltd.

[57] ABSTRACT

A clip for securing a molding of an automobile door, being of a substantially channel-shaped downwardly open sectional profile, has an outer leg for extending over the outer side of an outer surface of a portion of an outer panel constituting the lower edge of a window and an inner leg integral with the outer leg for extending over the outer surface of an auxiliary member secured to the inner surface of the outer panel portion or over the outer surface of a downwardly open channel-shaped portion thereof, the inner leg in engagement with the outer surface of the auxiliary member or the other surface of the downwardly open channel-shaped portion being provided with a lock pawl to be click engaged with the auxiliary member or the downwardly open channel-shaped portion, the outer leg having an inner projection projecting obliquely outwardly from the inner surface thereof toward the inner leg, and the inner projection having a pawl-like portion extending from the upper end toward the inner surface of the outer leg.

4 Claims, 3 Drawing Figures

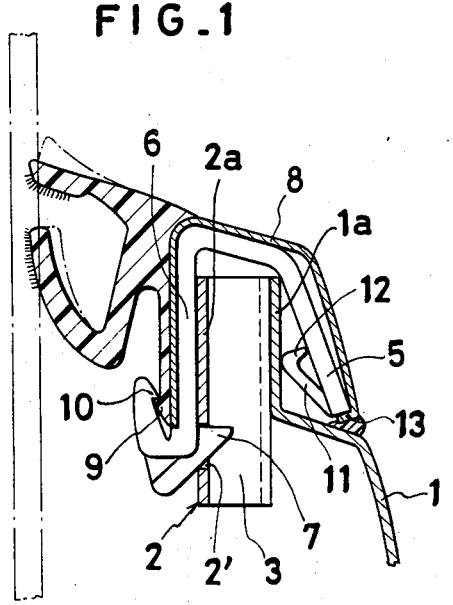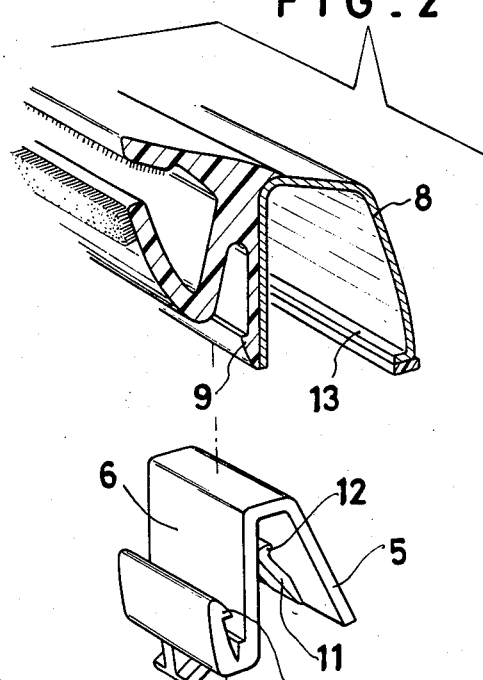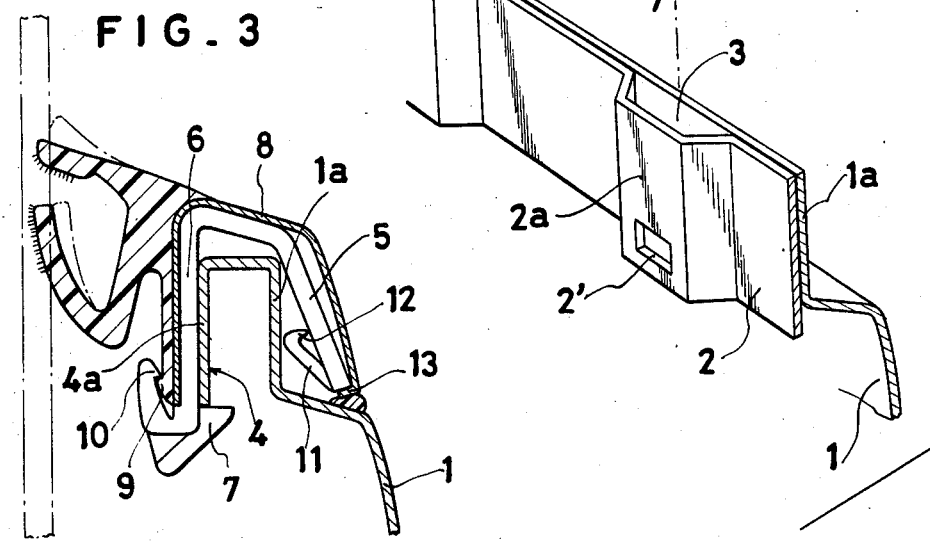

DEVICE FOR SECURING MOLDING OF AUTOMOBILE DOOR

FIELD OF THE INVENTION AND RELATED ART STATEMENT

This invention relates to a plastic clip for securing a molding along the lower edge of a window of an automobile door.

A prior art plastic clip of the type concerned is disclosed in Japanese Utility Model Publication No. SHO 58-4419.

The disclosed clip has a pair of clamping pieces facing each other across a narrow gap. A channel-shaped auxiliary member is secured by means of welding to the inner surface of a portion of an outer panel constituting a lower edge of a window so as to define a vertically open hole by the auxiliary member. The clip is fitted on the auxiliary member with one of the clamp legs inserted into the vertical open hole from above. A molding is fitted on the clip by pushing from above, whereby the molding is secured along the lower edge of the door window.

The lower edge of the door outer panel window, however, is not limited to the structure described above, with the channel-shaped auxiliary member secured to the inner surface. For example, it may have a structure as shown in FIG. 3, in which the outer panel has a downwardly open channel-shaped portion as a reinforcement portion constituting the lower edge of the window. The above clip cannot be mounted on such a window edge structure which does not have the vertically open hole defined by the auxiliary member.

OBJECT AND SUMMARY OF THE INVENTION

An object of the invention is to provide a clip for securing a molding of an automobile door, by which the molding can be reliably secured to the lower edge of an outer panel window regardless of whether the lower edge has the structure with the auxiliary member or the structure constituted by the downwardly open channel-shaped portion.

According to the invention, there is provided a clip for securing a molding of an automobile door, which, being of a substantially channel-shaped downwardly open sectional profile, has an outer leg for extending over the outer side of an outer surface of a portion of an outer panel constituting the lower edge of a window and an inner leg integral with the outer leg for extending over the outer surface of an auxiliary member secured to the inner surface of the outer panel portion or over the outer surface of a downwardly open channel-shaped portion thereof, the inner leg in engagement with the outer surface of the auxiliary member or the outer surface of the downwardly open channel-shaped portion being provided with a lock pawl to be click engaged with the auxiliary member or the downwardly open channel-shaped portion, the outer leg having an inner projection projecting obliquely outwardly from the inner surface thereof toward the inner leg, and the inner projection having a pawl-like portion extending from the upper end toward the inner surface of the outer leg.

The clip having this structure can be mounted on the lower edge of a window by pressing it on the lower edge so as to clamp the lower edge between the outer and inner legs and allow the lock pawl of the inner leg to engage with the auxiliary member secured on the inner surface of the door outer panel or the downwardly open channel-shaped portion so that it will not be detached upwardly. The molding can be secured along the lower edge of the window via this clip. When an outer portion of the molding in engagement with the outer leg is inwardly pushed, the inner projection is brought into contact with the outer panel, and the pawl-like portion projecting from the upper end of the inner projection supports the outer leg from the inner side. Therefore, the clip will not be turned down. Thus, it is possible to prevent the detachment of the clip due to otherwise possible detachment of the lock pawl from the clip hole or lower edge of the auxiliary member or downwardly open channel-shaped portion.

The above and other objects and features of the invention will become more apparent from the following description with reference to the accompanying drawings.

BRIEF DESCRIPTION OF THE DRAWINGS

FIG. 1 is a sectional view showing an embodiment of the clip according to the invention in the state used to secure a molding to an outer panel;

FIG. 2 is an exploded perspective view showing three parts shown in FIG. 1; and

FIG. 3 is a sectional view showing a different embodiment of the clip according to the invention in the state used to secure a molding to an outer panel.

DESCRIPTION OF THE PREFERRED EMBODIMENT

Referring to FIGS. 1 and 2, an auxiliary member 2 having a plurality of appropriately spaced-apart channel-shaped portions is secured by welding to the inner surface of a portion of an outer panel 1 constituting a lower edge of a window such that vertically open holes 3 are defined by the channel-shaped portions. The auxiliary member 2 may be replaced with a plurality of channel-shaped members which are secured by means of welding to the outer panel 1 such that each of them corresponds in position to one of the channel-shaped portions. FIG. 3 shows a structure, in which the portion of the outer panel 1 constituting a lower edge of a window has a downwardly open channel-shaped portion 4.

The clip according to the invention consists of a one-piece plastic molding having a substantially channel-shaped form open downwards. It has integral outer and inner leg portions 5 and 6. The outer leg 5 extends outwardly of the outer surface 1a of the outer panel 1 and the inner leg 6 extends outwardly of the outer surface 2a of the channel-shaped portions of the auxiliary member 2 or outwardly of the outer surface 4a of the downwardly open channel-shaped portion 4.

The lower end of the inner leg 6 has a lock pawl 7 projecting obliquely outwardly toward the outer leg 5 and a folded hook 10 which engages with a pawl 9 provided along the edge of a molding 8 having a substantially channel-shaped sectional profile open downwards. The outer leg 5 has an inner projection 11 projecting obliquely outwardly from the lower end of the inner surface toward the inner leg 6 and having a pawl-like portion 12 projecting from the upper end toward the inner surface of the outer leg 5.

Where the portion of the outer panel 1 constituting the lower edge of a window has the structure as shown in FIGS. 1 and 2, the clip is pushed in from above so as to cover the outer surface 2a of the channel-shaped portion of the auxiliary member 2 and a corresponding portion of the outer surface 1a of the outer panel 1. In this embodiment, the channel-shaped portion of the auxiliary panel has a clip hole 2' provided near the lower end and communicating with the hole 3. When the clip is completely fitted on the structure constituting the lower edge of the window, the lock pawl 7 is click fitted in the clip hole 2'.

Where the portion of the outer panel 1 constituting the lower edge of the window has the structure as shown in FIG. 3, the clip is fitted on the structure by pushing from above so that the outer and inner legs 5 and 6 respectively extend outwardly of the outer surface 1a of the outer panel 1 and outwardly of the outer surface of the downwardly open channel-shaped portion 4. When the clip is completely mounted, the lock pawl 7 of the inner leg 6 engages the lower edge of the channel-shaped portion 4 from below.

In the case of FIGS. 1 and 2, if desired, the position of the auxiliary member 2 may be raised so that the lock pawl 7 engages the lower edge of the member 2 from below. Also, in the case of FIG. 3, the downwardly open channel-shaped portion 4 may be provided with a clip hole, in which the lock pawl is click fitted.

When the clip or clips are fitted in either of the manners described, the molding is secured in position along the lower edge of the window by forcing the pawl 9 into engagement with the folded hook 10 at the lower edge of the inner leg 6, with a hook portion 13 provided along the other edge of the molding being engaged with the lower end of the outer leg 5.

It is possible to secure a required number of clips to the molding 8 at predetermined intervals and pressingly fit these clips with the molding so that the outer leg 6 thereof extends outwardly of the outer surface 1a of the outer panel 1 and the inner leg 6 thereof extends outwardly of the outer surface of the auxiliary member 2 or of the outer surface 4a of the downwardly open channel-shaped portion 4.

The hook portion 13 of the molding 8 is usually in contact with a stepped portion formed on the outer panel at a position slightly below the lower edge of the window.

According to the invention, it is possible to provide a clip with which the molding can be secured to the portion of an outer panel constituting the lower edge of a window having either a structure where an auxiliary member is provided on the inner surface of that portion or a structure constituted by a downwardly open channel-like portion 4. Futher, where the auxiliary member 2 or the downwardly open channel-shaped portion 4 is formed with a clip hole, in which the lock pawl 7 of the clip is click fitted, rust that may arise at the edges of the hole will not appear on the outside of the outer panel.

Further, even if the outer portion of the molding in engagement with the outer leg should be inwardly pushed, the inner projection 11 will be brought into engagement with the outer panel, and the pawl-like portion 12 projecting from the upper end of inner projection 11 will support the outer leg from the inner side. Therefore, the clip will not be turned down. Thus, it is possible to prevent the detachment of the clip due to otherwise possible detachment of the lock pawl 7 from the clip hole or lower edge of the auxiliary member or the downwardly open channel-shaped portion.

What is claimed is:

1. A clip for securing molding of an automobile door to a marginal portion of the door presenting opposite surfaces facing outwardly and inwardly with respect to the interior of the automobile, said clip being of substantially channel-shaped downwardly open sectional profile and including outer and inner legs connected by a web, said inner and outer legs having free ends distal the web for embracing said marginal portion and overlapping said outwardly and inwardly facing surfaces, said inner leg integral with a resilient lock pawl extending inwardly from said inner leg for engaging a complementary edge on said inner surface for securing said inner leg with respect to said marginal portion, the outer leg having an inner projection projecting obliquely inwardly from the free end of the inner surface of the outer leg toward said web and terminating in a free end, and the inner projection having a further portion extending from the free end of the inner projection outwardly toward and adjacent to the inner surface of the outer leg and being located for engaging between and contacting both said outer leg and said outwardly facing surface of the door marginal portion for preventing detachment of the clip from the door marginal portion when the clip is fully assembled with the door marginal portion.

2. The clip in claim 1 in combination with the marginal portion of an automobile door and a window molding having a substantially channel-shaped sectional profile open downward, said molding further having a hook shaped portion provided along its outer lower surface engaging the free end of the outer leg of the clip, and a pawl shaped portion provided along its inner lower surface engaging with a folded hook located along the free end of the inner leg of the clip.

3. The clip in claim 2, wherein said clip consists of a one-piece resilient plastic molding.

4. The clip in claim 1, wherein said clip consists of a one-piece resilient plastic molding.

* * * * *